United States Patent
Eltoft et al.

(10) Patent No.: US 10,924,453 B2
(45) Date of Patent: Feb. 16, 2021

(54) METHOD FOR ASSIGNING CONTROLLABLE LUMINAIRE DEVICES TO CONTROL GROUPS

(71) Applicant: IDEAL Industries, Inc., Sycamore, IL (US)

(72) Inventors: Justin D. Eltoft, Pleasant Prairie, WI (US); Joseph Markel, Elburn, IL (US); Matthew Deese, Raleigh, NC (US)

(73) Assignee: IDEAL Industries, Inc., Sycamore, IL (US)

( * ) Notice: Subject to any disclaimer, the term of this patent is extended or adjusted under 35 U.S.C. 154(b) by 0 days.

(21) Appl. No.: 16/864,735

(22) Filed: May 1, 2020

(65) Prior Publication Data

US 2021/0021568 A1    Jan. 21, 2021

Related U.S. Application Data

(63) Continuation-in-part of application No. 16/514,458, filed on Jul. 17, 2019, now Pat. No. 10,645,771.

(51) Int. Cl.
| | |
|---|---|
| *H05B 47/10* | (2020.01) |
| *H01L 29/12* | (2006.01) |
| *H04L 29/12* | (2006.01) |
| *H04L 29/08* | (2006.01) |
| *H04L 12/24* | (2006.01) |
| *H05B 47/175* | (2020.01) |

(52) U.S. Cl.
CPC ...... *H04L 61/2069* (2013.01); *H04L 41/0806* (2013.01); *H04L 41/0893* (2013.01); *H04L 67/125* (2013.01); *H05B 47/175* (2020.01)

(58) Field of Classification Search
CPC ............ H04L 61/2069; H04L 41/0893; H04L 41/0806; H04L 67/125
See application file for complete search history.

(56) References Cited

U.S. PATENT DOCUMENTS

| | | | |
|---|---|---|---|
| 8,543,249 B2 ‡ | 9/2013 | Chemel | H05B 37/0272 351/51 |
| 10,178,739 B2 ‡ | 1/2019 | Jonsson | H05B 37/0272 |
| 10,645,771 B1 * | 5/2020 | Eltoft | H05B 47/18 |
| 2011/0001436 A1 ‡ | 1/2011 | Chemel | H05B 37/029 315/291 |

(Continued)

*Primary Examiner* — Joseph L Williams
(74) *Attorney, Agent, or Firm* — Greenberg Traurig, LLP

(57) ABSTRACT

A method for automatically assigning a group address to a first controllable luminaire device of a plurality of controllable luminaire devices. The method determines whether adding the first controllable luminaire device to a logical community of controllable luminaire devices causes a number of controllable luminaire devices within the logical community of luminaire devices to exceed an established threshold. When it is determined that adding the first controllable luminaire device to the logical community of luminaire devices causes the number of controllable luminaire devices within the logical community of luminaire devices to exceed the established threshold, the method automatically assigns to each of the plurality of luminaire devices within the logical community of luminaire devices a group address for use in simultaneously controlling the luminaire devices as a group.

20 Claims, 2 Drawing Sheets

(56) References Cited

U.S. PATENT DOCUMENTS

| | | | |
|---|---|---|---|
| 2011/0018465 A1‡ | 1/2011 | Ashdown | H05B 33/0818 |
| | | | 315/294 |
| 2012/0025717 A1‡ | 2/2012 | Klusmann | H05B 37/0218 |
| | | | 315/152 |
| 2014/0293276 A1‡ | 10/2014 | Hughes | G01J 1/4204 |
| | | | 356/222 |
| 2015/0147067 A1‡ | 5/2015 | Ryan | H04B 10/116 |
| | | | 398/118 |
| 2015/0296599 A1‡ | 10/2015 | Recker | H05B 37/0272 |
| | | | 315/153 |

\* cited by examiner
‡ imported from a related application

US 10,924,453 B2

METHOD FOR ASSIGNING CONTROLLABLE LUMINAIRE DEVICES TO CONTROL GROUPS

CROSS-REFERENCE TO RELATED APPLICATION

This application is a continuation-in-part of application Ser. No. 16/514,458, filed on Jul. 17, 2019, currently pending.

BACKGROUND

U.S. Pat. No. 10,178,739 describes a method for automatically assigning a controllable luminaire device to a control group for commonly controlling the controllable luminaire devices that are assigned to that control group. A controllable luminaire device may comprise, for example, a luminaire unit with an integrated controller or a luminaire unit that is coupled to a separate controller. The controller includes an interface for coupling the controller to a lighting network and the controller is configured to control the luminaire unit based on commands received from the lighting network via the interface. According to the described method, a sensor value from a sensor unit assigned to a controllable luminaire device is determined. The sensor unit is coupled to the controller such that the controller can communicate the sensor value from the sensor unit to the lighting network. The controllable luminaire device is then assigned to a control group based on the sensor value.

SUMMARY

A method for automatically assigning a group address to a first controllable luminaire device of a plurality of controllable luminaire devices is described. The method generally determines whether adding the first controllable luminaire device to a logical community of controllable luminaire devices causes a number of controllable luminaire devices within the logical community of luminaire devices to exceed an established threshold. When it is determined that adding the first controllable luminaire device to the logical community of luminaire devices causes the number of controllable luminaire devices within the logical community of luminaire devices to exceed the established threshold, the method automatically assigns to each of the plurality of luminaire devices within the logical community of luminaire devices a group address for use in simultaneously controlling the luminaire devices as a group.

A better understanding of the objects, advantages, features, properties and relationships of the subject method for assigning controllable luminaire devices to control groups will be obtained from the following detailed description and accompanying drawings which set forth illustrative examples which are indicative of the various ways in which the principles hereinafter described may be employed.

BRIEF DESCRIPTION OF THE DRAWINGS

For a better understanding of the subject method for assigning controllable luminaire devices to control groups, reference may be had to the following drawings in which.

DETAILED DESCRIPTION

Figure 1:
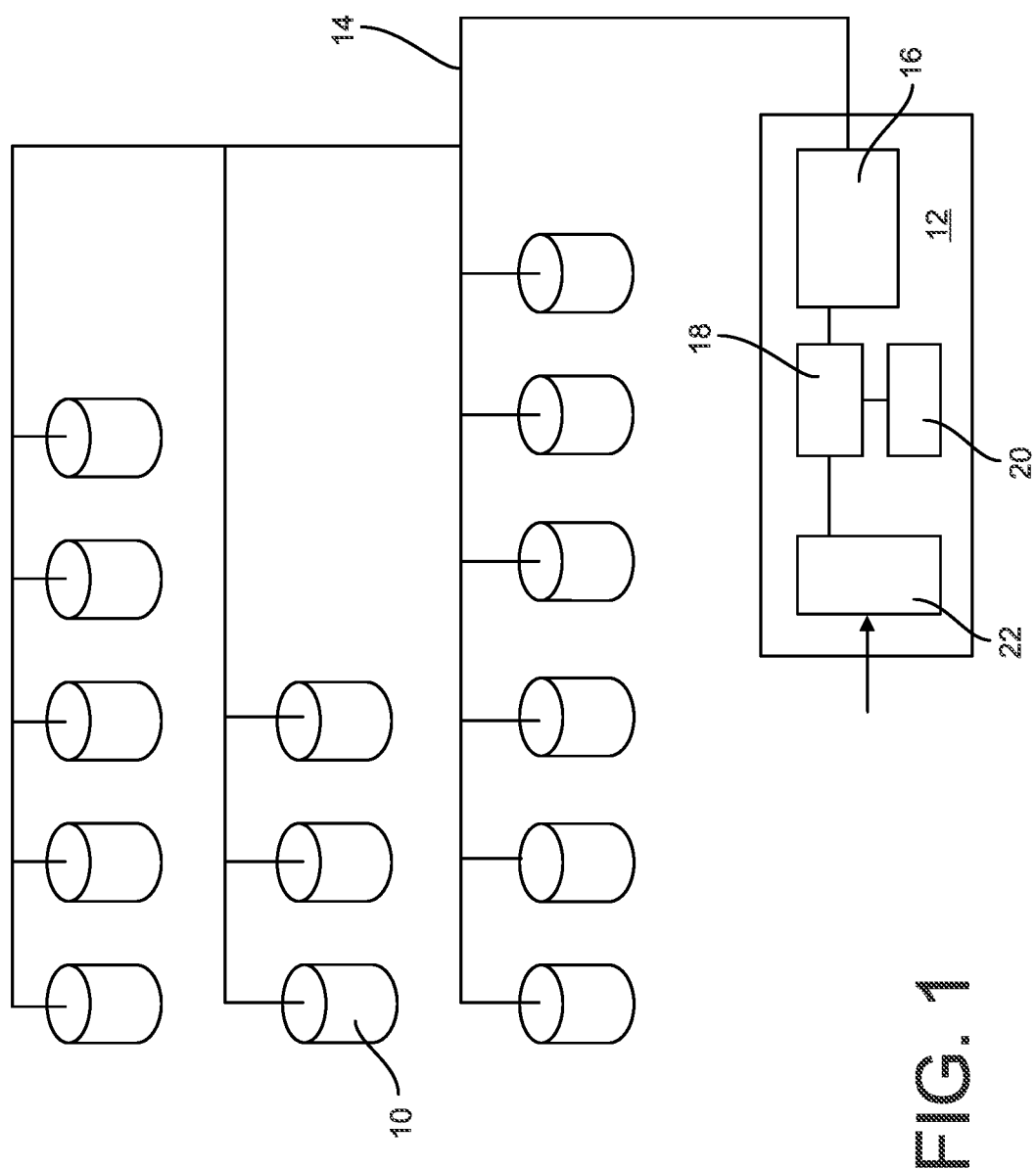
FIG. 1 illustrates an example light system.

With reference to FIG. 1, an example lighting system is schematically illustrated. In the illustrated lighting system, a plurality of controllable luminaire devices 10 are intended to be controlled via use of a network control device 12. To allow the network control device 12 to control each of the plurality of controllable luminaire devices 10, each of the plurality of controllable luminaire devices 10 includes or is otherwise associated with a corresponding controller having a lighting interface which lighting interface is, in turn, communicatively coupled via a network 14 to an interface 16 that is integral with or associated with the network control device 12. As further illustrated, the network control device 12 includes a processing device 18, a memory device 20, and a further interface 22 for allowing the network control device 12 to receive commands, data, etc. from one or more further devices, such as a sensor, a switch, a remote control, a computing device, and the like. As will be appreciated by those of skill in the art, the memory device 20 has stored thereon instructions that are executable by the processing device 18 to cause the network control device 12 to perform various operations in response to communications received via the further interface 20, for example, to cause the network control device 12 to issue communications via the network 14 for the purpose of controlling functional operations of one or more of the controllable luminaire devices 10.

The system may further include one or more sensors, in some embodiments, that may be communicatively coupled with the network control device 12. The sensors may include, for example, one or more motion sensors. The network control device 12 may be configured to actuate a controllable luminaire device 10, or a group associated with a controllable luminaire device, in response to motion detected by a motion sensor.

In the illustrated example, the network 14 comprises a "DALI" (digital addressable lighting interface) lighting network that enables comprehensive control of the plurality of luminaire devices 10 via use of the network control device 12. More particularly, in accordance with the "DALI" standard, a "DALI" capable network control device 12 can use the "DALI" protocol to individually address/control up to sixty-four luminaire devices 10 and to simultaneously address/control up to sixteen groups of luminaire devices 10 via use of multicast and broadcast messages. Control of a luminaire device 10 may include turning a luminaire unit on or off, setting a dim level of a luminaire unit, setting a color or optical exposure level for a luminaire unit, etc.

In addition to or instead of DALI, the network 14 may comprise another lighting device network that includes device grouping capability and group addressing, and the network control device 12 and controllable luminaire devices 10 may be configured for communications and operation on such a network 14. The network 14 may comprise a wired or wireless solution that has protocol and/or application-limited address space that therefore may benefit from the teachings of the instant disclosure as network and group address requirements for the network 14 increase due to increased scale of deployment. For example, the network 14 may include IEEE 802.15.4-based network protocols, a Bluetooth Low Energy (BLE) mesh network, a Zwave network, an X10 protocol network, and/or similar LAN/WLAN protocols used for lighting deployments.

To setup the system for such control, a "commissioning" procedure is utilized to assign to each luminaire device 10 a unique short address, for example in the numeric range 0 to 63. During the commissioning process a luminaire device 10 may also be associated within the system to a logical community of luminaire devices 10, e.g., be associated with other luminaire devices 10 located within a given location (such as a room), associated with other luminaire devices 10 that are to be controlled via use of the same input (such as a switch signal), etc. To control each luminaire device 10 within a logical community of luminaire devices 10, the network control device 12 may issue, via the network 14, an individual command to each luminaire device 10 using the unique address assigned to each luminaire device 10 within the logical community of luminaire devices 10. Alternatively, the network control device 12 may issue, via the network 14, a group command using one of the available sixteen group addresses that would have had to have been previously provisioned to each luminaire device 10 within the logical community of luminaire devices 10. It will be appreciated that the memory 20 (or external memory accessible by the control device 12) may be utilized to store a mapping between each luminaire device 10, its individual address, its logical community association (if any), and its group address (if any). Memory 20 may further store a respective location, activation schedule, and/or priority of one or more luminaire devices 10 or logical communities of luminaire devices.

Figure 2:
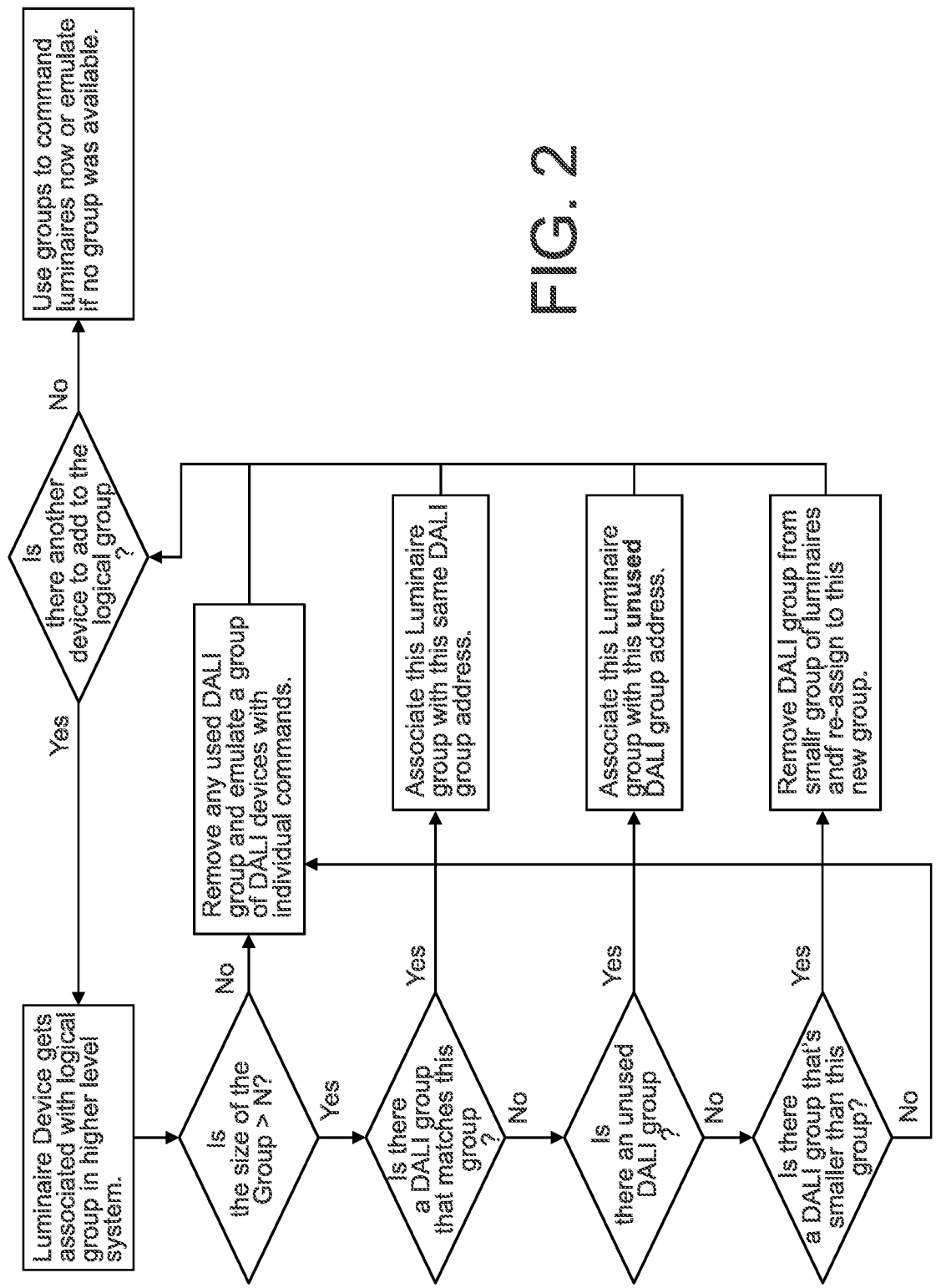
FIG. 2 illustrates an example method for assigning a group address to a controllable luminaire.

Turning to FIG. 2, a method for dynamically managing the provisioning of group addresses to luminaire devices 10 within a logical community of luminaire devices 10 is generally illustrated. In this regard, it is to be understood that, because issuing individual commands to each luminaire device 10 within a logical group of luminaire devices 10, i.e., "emulating" a group, can result in an unwanted "cascade" or "popcorn/raindrop" effect, e.g., an effect wherein the lights will turn on/off at different perceptible times depending upon the timing of the issuance of each individual command to each individual luminaire device 10, it is desired that luminaire devices 10 within a relatively larger logical community of luminaire devices 10, i.e., a logical community of luminaire devices 10 that exceeds a threshold number of luminaire devices 10, be controlled simultaneously via use of a group addressed command.

Accordingly, to this end, when the network control device 12 (or other computing device associated with the system) determines during a commissioning of a luminaire device 10 (or during a process in which a logical community association of a luminaire device is being changed) that the luminaire device 10 is being associated with one or more existing logical communities of luminaire devices 10 and the additional of the luminaire device 10 to an existing logical community of luminaire devices 10 causes that logical community of luminaire devices 10 to exceed an established threshold, the control device 12 may cause each luminaire device 10 in that logical community of luminaire devices 10 to be automatically provisioned with an available one (if any) of the sixteen group addresses. Of course, if an identical logical community of luminaire devices 10 is already associated with one of the sixteen group addresses, the luminaire device 10 being commissioned and being designated for inclusion within such logical community of luminaire device 10 can itself be provided with the group address that has already been associated with that logical community of luminaire devices 10. In the event a logical community of luminaire devices 10 does not exceed the established threshold, the luminaire devices 10 within that logical community of luminaire devices 10 will continue to be controllable as a group only via use of individual command issuances as described above.

In some circumstances, the threshold value may initially be set to two (or some other value as desired) and be thereafter set to a pre-established, higher value upon all sixteen of the group addresses being associated with a corresponding sixteen logical communities of luminaire devices 10. Preferably, the threshold is set to a value that avoids "thrashing" of the process (i.e. needless processing time wasted for smaller logical community sizes) while ensuring that the groups be of a size where the group "emulation" cascade effect noted above is avoided for larger logical communities of luminaire devices that would be most impacted thereby. In this example in which all of the sixteen group addresses have been provisioned, the control device 12 (or other computing device associated with the system) will again determine during a commissioning of a luminaire device 10 (or during a process in which a logical community association of a luminaire device is being changed) whether the luminaire device 10 is being associated with one or more existing logical communities of luminaire devices 10 and whether the addition of the luminaire device 10 to an existing logical community of luminaire devices 10 causes that logical community of luminaire devices 10 to exceed the threshold. In response to it being determined that a logical community of luminaire devices 10 will now exceed the threshold, the system may associate the group address that was associated with a logical community of luminaire devices 10 that is below the threshold with this larger logical community of luminaire devices 10 and, accordingly, automatically de-provision the group address from each luminaire device 10 in the smaller group while automatically provisioning that group address to each luminaire device 10 in the larger group. As a result of this process, the luminaire devices 10 within the smaller logical community of luminaire devices will only be controllable as a group via use of individual command issuances as described above. It will also be appreciated that, as logical community associations within the system are caused to be changed, e.g., as a result of combining, collapsing, and/or diverging of logical communities, the method steps set forth above are to be repeated to decide how to best allocate the group addresses as particularly shown in FIG. 2.

In the event that conflicts arise when determining which logical community of luminaire devices to select for "un-group" messaging, for example when two logical communities have the same, smaller number of luminaire devices 10 associated therewith, at the time of logical community creation one or more strategies can be utilized to select one of the conflicting logical communities for "un-grouping" or some other conflict resolution criteria and/or process may be established as desired. Furthermore, in instances where all logical communities of luminaire devices 10 will exceed the established threshold, the system may perform the same steps as described above by selecting the logical community having the smallest number of members (or the smallest logical community selected by use on any desired conflict resolution process) for de-provisioning whereupon the group address released by that logical community will be provisioned to the larger logical community of luminaire devices 10.

In another example conflict resolution process, a user may record a respective priority for one or more logical communities, and the lowest-priority logical community may be un-grouped when a group address is needed for a new logical community.

In another example conflict resolution process, a logical community may be selected for un-grouping according to a location (e.g., room) of that logical community and/or a location of the new logical community. For example, a logical community that is located closest to or farthest from a new logical community may be un-grouped. In another example, a logical community that is associated with a location has had the longest period of time since its last detected motion, or that has the lowest average detected motion for a period of time, may be un-grouped.

In another example conflict resolution process, a logical community may be selected for un-grouping according to an activation schedule associated with that logical community and/or with the new logical community. For example, a logical community that is scheduled to be activated during off-peak hours may be de-grouped before a logical community scheduled to be activated during peak hours.

In some embodiments, the methodology of FIG. 2 may be performed by individual controllers of the controllable luminaire devices 10. For example, each luminaire device may store the logical community or communities to which the luminaire device belongs. In some embodiments, each luminaire device may store each logical community on the network. When a logical community is to be assigned a group address, a controllable luminaire device (e.g., the controllable luminaire device that is being added to the logical community) may perform one or more aspects of the method of FIG. 2. In so doing, the controllable luminaire device may poll one or more other luminaire devices to learn about other logical communities (e.g., their addresses, number of devices, priorities, etc.) in order to make an appropriate group addressing decision as disclosed herein.

While specific examples have been described in detail, it will be appreciated by those skilled in the art that various modifications and alternatives to those details could be developed in light of the overall teachings of this disclosure. For example, in some circumstances, the system may request user/operator confirmation before taking any provisioning and/or de-provisioning actions. In addition, the method describe herein could be utilized in response to a user/operator simply changing a logical community association of a luminaire device 10 that was previously provisioned within the system, i.e., where a change causes one or more logical communities of luminaire devices 10 to increase in size. Accordingly, the arrangements disclosed herein are meant to be illustrative only and not limiting as to the scope of the invention which is to be given the full breadth of the appended claims and any equivalents thereof.

What is claimed is:

1. A method for automatically assigning a group address to a controllable luminaire device of a plurality of controllable luminaire devices, comprising:
   receiving an indication that the controllable luminaire device is to be added to a logical community of controllable luminaire devices;
   determining that adding the controllable luminaire device to the logical community causes a number of controllable luminaire devices within the logical community to exceed an established threshold; and
   in response to determining that adding the controllable luminaire device to the logical community causes the number of controllable luminaire devices within the logical community to exceed the established threshold, automatically assigning to each of the plurality of controllable luminaire devices within the logical community a group address and thereafter using a command addressed to the group address to commonly control those controllable luminaire devices of the plurality of controllable luminaire devices within the logical community as a group.

2. The method of claim 1, wherein the logical community of controllable luminaire devices is a first logical community of controllable luminaire devices, and wherein the group address was previously assigned to a second logical community of controllable luminaire devices, the method further comprising:
   automatically de-assigning the group address that was previously assigned to a second logical community of controllable luminaire devices from each of the plurality of controllable luminaire devices within the second logical community.

3. The method of claim 2, further comprising:
   determining that none of a plurality of group addresses is available for assignment to the first logical community of controllable luminaire devices, wherein the group address is one of the plurality of group addresses;
   wherein automatically de-assigning the group address that was previously assigned to the second logical community of controllable luminaire devices from each of the plurality of controllable luminaire devices within the second logical community comprises selecting the second logical community according to one or more of a user-set priority of the second logical community, a location of the second logical community, or an actuation schedule associated with the second logical community.

4. The method of claim 2, further comprising:
   determining that each of a plurality of group addresses is previously assigned to a respective one of a plurality of logical communities of controllable luminaire devices, wherein the group address is one of the plurality of group addresses and the second logical community is one of the plurality of logical communities; and
   determining that the second logical community is a smallest in number of controllable luminaire devices of the plurality of logical communities;
   wherein automatically de-assigning the group address that was previously assigned to the second logical community from each of the plurality of controllable luminaire devices within the second logical community is in response to determining that the second logical community is a smallest in number of controllable luminaire devices of the plurality of logical communities.

5. The method of claim 2, further comprising:
   determining that each of a plurality of group addresses is previously assigned to a respective one of a plurality of logical communities of controllable luminaire devices, wherein the group address is one of the plurality of group addresses and the second logical community is one of the plurality of logical communities; and
   determining that the second logical community comprises a number of controllable luminaire devices that does not exceed the established threshold;
   wherein automatically de-assigning the group address that was previously assigned to the second logical community from each of the plurality of controllable luminaire devices within the second logical community is in response to determining that the second logical community comprises a number of controllable luminaire devices that does not exceed the established threshold.

6. The method of claim 2, further comprising:
   after automatically de-assigning the group address that was previously assigned to the second logical community of controllable luminaire devices from each of the plurality of controllable luminaire devices within the second logical community, using commands addressed to each of those controllable luminaire devices of the plurality of controllable luminaire devices within the second logical community individually to control each of those controllable luminaire devices of the plurality of controllable luminaire devices within the second logical community as a group.

7. The method of claim 1, further comprising:
determining that the group address is not assigned to any logical community of controllable luminaire devices;
wherein automatically assigning the group address to each of the plurality of luminaire devices within the logical community is further in response to determining that the group address is not assigned to any logical community of controllable luminaire devices.

8. A network control device comprising:
a processor; and
a non-transitory computer-readable memory storing instructions that, when executed by the processor, cause the processor to:
receive an indication that a controllable luminaire device is to be added to a logical community of controllable luminaire devices;
determine that adding the controllable luminaire device to the logical community causes a number of controllable luminaire devices within the logical community to exceed an established threshold; and
in response to determining that adding the controllable luminaire device to the logical community causes a number of controllable luminaire devices within the logical community to exceed an established threshold, automatically assign to each of the plurality of luminaire devices within the logical community a group address and thereafter using a command addressed to the group address to commonly control those controllable luminaire devices of the plurality of controllable luminaire devices within the logical community as a group.

9. The network control device of claim 8, wherein the logical community of controllable luminaire devices is a first logical community of controllable luminaire devices, and wherein the group address was previously assigned to a second logical community of controllable luminaire devices, wherein the memory stores further instructions that, when executed by the processor, cause the processor to:
automatically de-assign the group address that was previously assigned to a second logical community of controllable luminaire devices from each of the plurality of controllable luminaire devices within the second logical community.

10. The network control device of claim 9, wherein the memory stores further instructions that, when executed by the processor, cause the processor to:
determine that none of a plurality of group addresses is available for assignment to the first logical community of controllable luminaire devices, wherein the group address is one of the plurality of group addresses;
wherein automatically de-assigning the group address that was previously assigned to the second logical community of controllable luminaire devices from each of the plurality of controllable luminaire devices within the second logical community comprises selecting the second logical community according to one or more of a user-set priority of the second logical community, a location of the second logical community, or an actuation schedule associated with the second logical community.

11. The network control device of claim 9, wherein the memory stores further instructions that, when executed by the processor, cause the processor to:
determine that each of a plurality of group addresses is previously assigned to a respective one of a plurality of logical communities of controllable luminaire devices, wherein the group address is one of the plurality of group addresses and the second logical community is one of the plurality of logical communities; and
determine that the second logical community is a smallest in number of the plurality of logical communities;
wherein automatically de-assigning the group address that was previously assigned to the second logical community of controllable luminaire devices from each of the plurality of controllable luminaire devices within the second logical community of controllable luminaire devices is in response to determining that the second logical community of controllable luminaire devices is a smallest in number of the plurality of logical communities.

12. The network control device of claim 9, wherein the memory stores further instructions that, when executed by the processor, cause the processor to:
determine that each of a plurality of group addresses is previously assigned to a respective one of a plurality of logical communities of controllable luminaire devices, wherein the group address is one of the plurality of group addresses and the second logical community is one of the plurality of logical communities; and
determine that the second logical community of controllable luminaire devices comprises a number of controllable luminaire devices that does not exceed the established threshold;
wherein automatically de-assigning the group address that was previously assigned to the second logical community from each of the plurality of controllable luminaire devices within the second logical community is in response to determining that the second logical community comprises a number of controllable luminaire devices that does not exceed the established threshold.

13. The network control device of claim 9, wherein the memory stores further instructions that, when executed by the processor, cause the processor to:
after automatically de-assigning the group address that was previously assigned to the second logical community from each of the plurality of controllable luminaire devices within the second logical community, use commands addressed to each of those controllable luminaire devices of the plurality of controllable luminaire devices within the second logical community individually to control each of those controllable luminaire devices of the plurality of controllable luminaire devices within the second logical community as a group.

14. The network control device of claim 8, wherein the memory stores further instructions that, when executed by the processor, cause the processor to:
determine that the group address is not assigned to any logical community of controllable luminaire devices;
wherein automatically assigning the group address to each of the plurality of luminaire devices within the logical community is further in response to determining that the group address is not assigned to any logical community of controllable luminaire devices.

15. The network control device of claim 8, further comprising:
a network interface, wherein the network control device is configured to be communicatively coupled with the logical community of controllable luminaire devices via the network interface.

16. A network control device comprising:
a processor; and
a non-transitory computer-readable memory storing instructions that, when executed by the processor, cause the processor to:
  receive an indication that a controllable luminaire device is to be added to a logical community of controllable luminaire devices;
  determine that adding the controllable luminaire device to the logical community does not cause a number of controllable luminaire devices within the logical community to exceed an established threshold; and
  in response to determining that adding the controllable luminaire device to the logical community does not cause the number of controllable luminaire devices within the logical community to exceed an established threshold, use commands addressed to each of those controllable luminaire devices of the plurality of controllable luminaire devices within the logical community individually to control each of those controllable luminaire devices of the plurality of controllable luminaire devices within the logical community as a group.

17. The network control device of claim 16, wherein the controllable luminaire device is a first controllable luminaire device, wherein the memory stores further instructions that, when executed by the processor, cause the processor to:
  receive an indication that a second controllable luminaire device is to be added to the logical community of controllable luminaire devices;
  determine that adding the second controllable luminaire device to the logical community causes the number of controllable luminaire devices within the logical community to exceed the established threshold; and
  in response to determining that adding the second controllable luminaire device to the logical community causes the number of controllable luminaire devices within the logical community to exceed the established threshold, automatically assign to each of the plurality of controllable luminaire devices within the logical community a group address and thereafter use a command addressed to the group address to commonly control those controllable luminaire devices of the plurality of controllable luminaire devices within the logical community as a group.

18. The network control device of claim 17, wherein the memory stores further instructions that, when executed by the processor, cause the processor to:
  determine that the group address is not assigned to any logical community of controllable luminaire devices;
  wherein automatically assigning the group address to each of the plurality of luminaire devices within the logical community of luminaire devices is further in response to determining that the group address is not assigned to any logical community of controllable luminaire devices.

19. The network control device of claim 17, wherein the logical community of controllable luminaire devices is a first logical community of controllable luminaire devices, and wherein the group address was previously assigned to a second logical community of controllable luminaire devices, wherein the memory stores further instructions that, when executed by the processor, cause the processor to:
  automatically de-assign the group address that was previously assigned to the second logical community from each of the plurality of controllable luminaire devices within the second logical community; and
  after automatically de-assigning the group address that was previously assigned to the second logical community from each of the plurality of controllable luminaire devices within the second logical community, use commands addressed to each of those controllable luminaire devices of the plurality of controllable luminaire devices within the second logical community individually to control each of those controllable luminaire devices of the plurality of controllable luminaire devices within the second logical community as a group.

20. The network control device of claim 16, further comprising:
  a network interface, wherein the network control device is configured to be communicatively coupled with the logical community of controllable luminaire devices via the network interface.

* * * * *